Patented Dec. 18, 1951

2,578,653

UNITED STATES PATENT OFFICE 2,578,653

METHOD FOR STABILIZING POLYDIENE POLYMER REACTED WITH SULFUR DIOXIDE AND RESULTING PRODUCTS

Johan Michael Goppel, Gottfried Ernst Rumscheidt, and Johannes Thomas Hackmann, Amsterdam, Netherlands, assignors to Shell Development Company, San Francisco, Calif., a corporation of Delaware No Drawing. Application April 26, 1949, Serial No. 89,803. In the Netherlands May 18, 1948

15 Claims. (Cl. 260—769)

This invention is directed to a process for the stabilization of products formed on reacting inorganic acidifying compounds with rubbery polymers comprising high molecular weight, polyunsaturated compounds. The invention also relates to the resulting stabilized reaction products.

The term "high molecular weight, polyunsaturated compound," as employed herein, embraces those compounds having a molecular weight of at least 5,000 and which contain a plurality of unsaturated linkages in the molecule. These compounds are either polymers of organic compounds containing a plurality of unsaturated linkages in the molecule, or are copolymers of such multiple-unsaturated compounds with other unsaturated organic compounds of one type or another. The term includes the various natural rubbers such as latex, crepe, sheet, caoutchouc, gutta percha, balata, and cyclo rubbers, as well as unsaturated synthetic rubbers. Representative synthetic polymers of high molecular weight are the polymerization products of butadiene and those of its homologues and derivatives, as, for example, methyl butadiene polymers, dimethyl butadiene polymers, pentadiene polymers, and chloroprene polymers (neoprene synthetic rubber). Representative copolymers of high molecular weight which come within the term are those formed from butadiene, its homologues and derivatives, with other unsaturated organic compounds. Among the latter are the acetylenes, as vinyl acetylene, the olefins, as isobutylene which copolymerizes with butadiene to form butyl synthetic rubber; the vinyls, as vinyl chloride, acrylic acid, acrylonitrile (which polymerizes with butadiene to form the synthetic rubber Buna N), methacrylic acid, and styrene, the latter compound polymerizing with butadiene to form the synthetic rubber Buna S; as well as the vinyl esters and various unsaturated aldehydes, ketones and ethers, e. g., acrolein, methyl isopropenyl ketone, and vinyl ethyl ether. The above-defined, polyunsaturated, high molecular weight compounds, including both natural and synthetic rubbers, may properly be termed "high molecular weight polymers of diene-hydrocarbons," or preferably, "rubbery polymers of at least one compound selected from the group consisting of the conjugated diolefines and chloroprene."

As employed herein, the term "inorganic acidifying compound" embraces the various inorganic acids and acid anhydrides wherein the acid-forming element (as sulfur, nitrogen or phosphorus, for example), if possessing several valencies, is present, in a valency other than the highest thereof. Preferred acidifying compounds are the acid anhydrides, sulfur dioxide, phosphorus trioxide and nitrous trioxide, as well as the acids formed from these anhydrides. Other useful acidifying compounds are hydrogen sulfide, hydrochloric acid, hydrobromic acid, hydroiodic acid, and hyrofluoric acid. The term does not include such compounds as sulfur trioxide, phosphorus pentoxide, nitrogen pentoxide, or their corresponding acids, for in all these compounds the acid-forming element, which is here either sulfur, phosphorus or nitrogen, is present in the highest of several possible valencies. Of the various acidifying compounds set forth herein, the most preferred compound for employment in the present invention is sulfur dioxide.

It is known that the high molecular weight polyunsaturated compounds lend themselves well to the production of various shapes, including those of a continuous, non-supported nature, as filaments, rods, strips, sheets, and the like. Furthermore, it is known that the properties of such shapes may be improved by reacting the unsaturated, high molecular weight compound with one or more of the inorganic acidifying compounds mentioned above, particularly sulfur dioxide. The exact nature of this reaction is not clearly understood, though it is evident that a quantity of the acidifying ingredient is taken up in one form or another by the high molecular weight reactant. The extent of this reaction is normally measured by, and expressed in terms of, the amount of acid-forming element (sulfur, phosphorus or nitrogen, for example) present in the resulting reaction product.

It has also been possible to improve the nature of the foregoing reaction products by incorporating therein, normally prior to the reaction with sulfur dioxide or other acidifying ingredient, a quantity of a low molecular weight, unsaturated compound. The resulting reaction product has a number of advantages, chief among which is a greatly improved acceptance for all the commonly employed dyestuffs. Representative unsaturated compounds which may be employed in this manner, all of which have a molecular weight of below 5,000 are alkadienes such as butadiene and 1,5-hexadiene, and alkenyl compounds such as allyl alcohol, allyl chloride, allyl acetate, allyl capronate, allyl isothiocyanate, allyl oleate, and more especially, diallyl compounds such as diallyl phthalate and diallyl adipate. The method by which unsaturated reactants of both high and low molecular weight are utilized in forming reaction products with acidifying compounds forms the subject of copending application, Serial No. 15,048, filed March 15, 1948, and reference is hereby made to said application for a more complete description of the invention there disclosed.

It should be noted that while the high molecular weight, polyunsaturated compounds, or mixtures of both high as well as low molecular weight unsaturated compounds, may be reacted with the acidifying compound without prior modification of either reactant, improved results are obtained when the unsaturated compounds are first activated by treatment with a hydroperoxide such as decalin hydroperoxide, or tetralin hydroperoxide. Activation methods of this nature are disclosed in copending applications, Serial Nos. 760,924, filed July 14, 1947, now Patent No. 2,469,847, and 788,312, filed November 26, 1947, now Patent No. 2,558,498, to which applications reference is here made. The peroxide treatment is also disclosed in copending application Serial No. 15,048, referred to above, as said activation treatment relates to mixtures of high and low molecular weight unsaturated reactants.

While the reaction products discussed above have proven well adapted for many uses, they have proven particularly useful when formed into filaments of the type which can be woven into textiles, either alone or in conjunction with fibers of other materials. Thus, filaments produced by spinning a peroxide-activated rubber solution into a sulfur dioxide-containing coagulating bath have a high elementary denier, with good tensile strength, a relatively high degree of elongation prior to rupture, and good flexibility and other characteristics making for ease of working and handling. In view of these many favorable qualities, it has been highly disappointing to realize that even in the case of the best reaction products hitherto obtainable, deterioration of the filament or other shape with age, heating and/or exposure to ultra-violet light is unduly rapid. This deterioration is manifested in a variety of ways, but chiefly in a sharp falling off in tensile strength and in the degree of permissible stretch prior to rupture. In many instances undesirable color changes also ensue. These various changes are greatly speeded up as the objects under consideration are heated, particularly above 100° C., or are exposed to ultra-violet or other light rays. It has been observed that the deterioration in physical properties is attended by a loss of sulfur dioxide or equivalent acid constituent from the reaction product, a loss which is generally proportional to the aforementioned deterioration. Accordingly, the rapidity with which a given product loses its acid constituent may also be taken as a measure of its stability, i. e., its resistance to deterioration with age, heating and/or exposure to light.

It is an object of the present invention to provide a method for obtaining stable products of the type formed on the reaction of high molecular weight, polyunsaturated compounds with inorganic acidifying compounds. A more particular object is to provide reaction products of this character which are stable and resist deterioration on being aged, heated, or exposed to light. A still further object is to provide filaments and like continuous, non-supported shapes composed of such reaction products which are characterized by a continued high tensile strength and high degree of stretch prior to rupture, as well as by a relatively small loss of acidifying compound, when aged, heated or exposed to light. The nature of still other objects will be apparent from the nature of the following description.

It has been discovered that improved resistance to deterioration with age, heating and/or exposure to light rays may be imparted to objects composed of the products formed on reacting high molecular weight, polyunsaturated compounds with inorganic acidifying compounds, by incorporating in said objects one or more stabilizer compounds selected from the group consisting of the salts and esters of cyanic, isocyanic, thiocyanic and isothiocyanic acids. The improvement is particularly marked as regards improved stability at high temperatures.

As representative compounds coming within this group there may be mentioned sodium cyanate, potassium cyanate, ammonium cyanate, ethyl isocyanate, phenyl isocyanate, isopropyl isocyanate, isobutyl isocyanate, allyl isocyanate, lead cyanate, mercurous cyanate, potassium isocyanate, sodium isocyanate, ammonium isocyanate, potassium thiocyanate (potassium rhodamide), ammonium thiocyanate (ammonium rhodamide), allyl thiocyanate, ethylene thiocyanate, methylene thiocyanate, thiocyanoacetone, phenyl thiocyanate, benzyl thiocyanate, sodium isothiocyanate, and potassium isothiocyanate. A preferred group of compounds for use in the present invention is that made up of the alkali metal and ammonium salts of thiocyanic acid.

The foregoing salt and ester compounds may be employed either alone, in combination with one another, or with other types of stabilizer compounds. Among the latter may be mentioned various urea-type compounds such as urea, thiourea, guanidine, N,N'-diphenyl urea, and N,N'-diphenyl thiourea, compounds of this type being described in copending application Serial No. 37,056, filed July 3, 1948; amines and amine salts, representative compounds of the latter type, as described in copending application Serial No. 89,801, filed April 26, 1949, being hexamethylenetetramine, melamine, heptadecylamine, benzyl amine, and the like; and amides such as dicyandiamide, acetamide, zinc dimethyldithiocarbomate, and thiuram disulfide, the use of amide stabilizers being described in copending application Serial No. 89,802, filed April 26, 1949.

The stabilizer chosen, which, as noted above, may be one or a mixture of several compounds, can be incorporated in the reaction product in one or more of a number of different ways. Thus, for example, the stabilizer may be added to the solutio nof rubber or other polyunsaturated high molecular weight reactant before the same is brought into reactive engagement with the sulfur dioxide or other acidifying compound employed; alternatively, the stabilizer may be added to the medium containing the acidifying compound. The practice of either of the foregoing methods requires that the stabilizer be soluble, or at least dispersible in, the liquid medium present, and preferably it should in no way interfere with the desired reaction between the respective unsaturated and acidic compounds. Since some such interference may occur, particularly as the concentration of stabilizer is increased or the more alkaline stabilizers are employed, the preferred manner of adding the stabilizer is to bring a solution thereof into contact with the already formed reaction product, preferably when the latter is still in the swollen condition due to its manner of production in the coagulating bath and/or as a result of subsequent washing or soaking steps. Thus, filaments produced by spinning a solution of peroxide activated rubber into an ethanol-water-sulfur dioxide coagulating bath may thereafter be immersed in a solution of a stabilizer, as potassium thiocyanate in ethanol, for example, and left therein for any desired period of time. Other appropriate solvents are acetone, propanol, butanol and methyl ethyl ketone. On being withdrawn from the stabilizer solution, the filaments may then be washed in the conventional manner, stretched, dyed or otherwise treated, following which they may be dried and used. If desired, one or more of such washing, drying, stretching and/or dyeing steps may intervene between the actual precipitation of the filaments in the coagulating bath and their immersion in the stabilizer solution. Alternatively, the filaments may be treated in the dried (unswollen) condition with a solution of the desired stabilizing compound, preferably in a solvent such as benzene, ethyl alcohol, acetone or ethyl acetate which acts to swell the filament, though non-filament swelling solvents such as water may be employed in many cases. The stabilizers may also be applied otherwise than by impregnation. Thus, the material may be contacted with dispersions of stabilizers or with an atmosphere which contains the stabilizers in the vaporous or atomized state. In the latter case a solution of the stabilizer may be atomized, if desired.

The concentration of stabilizer to employ, whether the same be added to the unreacted materials, or is applied as a solution to the already formed reaction product, is not critical. Thus, good results are obtained with solutions containing from about 0.1 to 20% by weight of a stabilizer, and some improvement can be effected even when using smaller quantities than 0.1%. Preferably, however, the concentration of stabilizer should be at least 0.5% based on the entire weight of the solution, with concentrations of more than 10% seldom being justified in terms of improved results.

The period during which any given reaction product should be left in a stabilizer solution will vary depending on a number of circumstances. Thus, in the case of filaments and other small shapes the soaking period may be somewhat shorter than with articles of greater cross section. Again, with more concentrated stabilizer solutions the soaking period may be somewhat shortened. Another factor is the ease with which the reaction product is able to take up the stabilizer solution, freshly formed, undried products (i. e. swollen filaments) being considerably more receptive to the stabilizer solution than dried ones. In general, immersion periods of from 1 to 30 minutes are satisfactory with swollen filaments though soaking periods of one or more hours are desirable when treating dried filaments. In all cases extension of the soaking time is in no way harmful and in many cases proves of considerable benefit. Where the stabilizer is added to the unreacted solution of rubber or sulfur dioxide, for example, no modification need be made in the normal process by which said compounds are reacted.

Of more importance than the duration of the treatment with stabilizer solution is the temperature thereof. It forms a feature of the present invention that improved results are obtained by employing a heated stabilizer solution, by which term is meant a solution having a temperature of 50° C. or above, and preferably between 50 and 150° C. The use of such heated solutions serves in a measure to fix the stabilizer in the reaction product, thereby increasing its resistance to removal particularly following washing or other treating steps.

Still further improved results, notably as regards increased stability following soap-washing and/or alkali-treating steps, are achieved by subjecting reaction products already impregnated with stabilizer compound to a treatment involving heating said products in a gaseous environment such as air or nitrogen. The temperatures employed in this heating step may range from about 50 to 250° C., though temperatures of from about 80 to 150° C. are preferred. Effective treatments carried out in the latter temperature range normally take from ½ to 4 or more hours, the relatively higher temperature permitting effective use of the shorter treating intervals. This so called "dry" heating step may be practiced with beneficial results no matter whether the impregnation treatment referred to in the preceding paragraph be conducted at elevated temperatures or not, though as a general rule the one heating treatment re-enforces the other.

It has also been found that improved results as regards fixation of stabilizer may be obtained by utilizing stabilizer compounds such as allyl isocyanate and allyl thiocyanate which contains one or more alkenyl or other unsaturated, aliphatic groups. Such unsaturated stabilizing compounds are preferably introduced into a solution of rubber or other high molecular weight reactant prior to its reaction with the acidic compound if the full effect of the stabilization treatment is to be obtained, for it seems quite probable that under these circumstances the stabilizer enters into, and chemically forms a part of, the final reaction product.

The following example illustrates the present invention in various of its embodiments:

EXAMPLE

The material to be stabilized was a reaction product of a natural rubber with sulfur dioxide in the form of dry filaments having a sulfur content of 22% by weight, which material was produced by spinning a solution of natural rubber and tetralin hydroperoxide into a sulfur dioxide-containing coagulating bath, and thereafter stretching, washing and drying the filaments in air at room temperature. Samples of these dried filaments were then soaked for four hours in solutions of various stabilizers in ethanol as indicated in the following table, which also shows the concentration and temperature of each solution. Following the soaking treatment the filaments were cursorily rinsed with ethanol and again dried in air. Some of the samples were then washed for periods of four hours at 60° C. in a 0.4% solution of Marseilles soap. The stability was ascertained by the quantity of $SO_2$ split off per unit of weight from the material to be examined when heated in a current of air for two hours at 125° C. These quantities are expressed in percentages of the quantity of $SO_2$ split off per unit of weight in a blank test.

Table

| | Stabilizer | Conc., Per Cent | Temp., °C. | $SO_2$ split off on heating | |
|---|---|---|---|---|---|
| | | | | Before soap washing | After soap washing |
| 1 | None | | | 100 | 100 |
| 2 | Potassium Rhodamide | 2 | 78 | 3 | 50 |
| 3 | Ammonium Rhodamide | 2 | 20 | 7 | 40 |
| 4 | Ammonium Rhodamide + Hexamethylene tetramine | 0.75<br>0.75 | 20 | 6 | 18 |

The invention claimed is:

1. The method of increasing the resistance to deterioration of a product formed on the reaction of natural rubber with sulfur dioxide, said method comprising impregnating said product with a solution containing from 0.1 to 20% ammonium thiocyanate.

2. The method of increasing the resistance to deterioration of a product formed on the reaction of natural rubber with sulfur dioxide, said method comprising impregnating said product with a solution containing from 0.1 to 20% potassium thiocyanate.

3. The method of increasing the resistance to deterioration of a product formed on the reaction of natural rubber with sulfur dioxide, said method comprising impregnating said product with a solution containing from 0.1 to 20% of an alkali metal thiocyanate.

4. The method of increasing the resistance to deterioration of a product formed on the reaction of natural rubber with sulfur dioxide, said method comprising impregnating said product with a solution containing a total of from 0.1 to 20% of at least one stabilizer compound selected from the group consisting of the salts and esters of thiocyanic acid in which the alkyl group contains from 1 to 5 carbon atoms.

5. The method of claim 4 wherein the said stabilizer compound is incorporated in said reaction product by immersing the product in a heated solution of the compound.

6. The method of claim 4 wherein there is added the step of heating the stabilizer-containing product in a gaseous environment.

7. The method of increasing the resistance to deterioration of a product formed on the reaction of sulfur dioxide with a rubbery polymer of at least one compound selected from the group consisting of the conjugated diolefins and chloroprene, said method comprising impregnating said product with a solution containing from 0.1 to 20% of a stabilizer compound selected from the group consisting of the salts and esters of thiocyanic acid in which the alkyl group contains from 1 to 5 carbon atoms.

8. In a method whereby a solution of natural rubber and tetralin hydroperoxide is injected into a coagulating bath containing available sulfur dioxide, whereby there is precipitated in the bath a reaction product of the rubber and sulfur dioxide in the form of a continuous, swollen filament which is then withdrawn from the bath, the step comprising impregnating the still swollen filament with a solution containing a total of from 0.1 to 20% of at least one stabilizer compound selected from the group consisting of the salts and esters of thiocyanic acid in which the alkyl group contains from 1 to 5 carbon atoms.

9. The method of claim 8 wherein the stabilizer compound employed is ammonium thiocyanate.

10. The method of claim 8 wherein the stabilizer compound employed is an alkali metal thiocyanate.

11. In a method wherein a solution of a rubbery polymer of at least one compound selected from the group consisting of the conjugated diolefins and chloroprene is injected into a coagulating bath containing available sulfur dioxide, whereby there is precipitated in the bath a reaction product of the rubbery polymer with sulfur dioxide in the form of a continuous swollen filament; which is then withdrawn from the bath, the step comprising impregnating the still swollen filament with a solution containing a total of from 0.1 to 20% of at least one stabilizer compound selected from the group consisting of the salts and esters of thiocyanic acid in which the alkyl group contains from 1 to 5 carbon atoms.

12. The method of increasing the resistance to deterioration of a product formed on the reaction of natural rubber with sulfur dioxide, said method comprising impregnating said product with a solution containing at least 0.1% ammonium thiocyanate and at least 0.1% hexamethylenetetramine, the total amount of ammonium thiocyanate and hexamethylenetetramine in said solution being from 0.2 to 20% by weight.

13. A novel composition of matter comprising a reaction product of sulfur dioxide with a high molecular weight polymer of a diene-hydrocarbon, which reaction product is impregnated with a stabilizer compound selected from the group consisting of alkali metal thiocyanates, ammonium thiocyanates and alkyl esters of thiocyanic acid in which the alkyl group contains from 1 to 5 carbon atoms, said stabilizer compound being present in an amount sufficient to increase the resistance of the reaction product against deterioration.

14. The composition of claim 13 wherein the polyunsaturated compound is natural rubber and wherein the reaction product is impregnated with ammonium thiocyanate.

15. The composition of claim 13 wherein the polyunsaturated compound is natural rubber and wherein the reaction product is impregnated with alkali metal thiocyanate.

JOHAN MICHAEL GOPPEL.
GOTTFRIED ERNST RUMSCHEIDT.
JOHANNES THOMAS HACKMANN.

REFERENCES CITED

The following references are of record in the file of this patent:

UNITED STATES PATENTS

| Number | Name | Date |
|---|---|---|
| 1,410,699 | Martin | Mar. 28, 1922 |
| 1,839,950 | Cadwell | Jan. 5, 1932 |
| 2,136,342 | Holden | Nov. 8, 1938 |
| 2,313,945 | Kellog | Mar. 16, 1943 |
| 2,381,186 | Roquemore | Aug. 7, 1945 |
| 2,415,839 | Neal et al. | Feb. 18, 1947 |
| 2,469,847 | De Nie et al. | May 10, 1949 |